United States Patent [19]

Efner et al.

[11] Patent Number: 5,194,506
[45] Date of Patent: Mar. 16, 1993

[54] POLYETHYLENE TEREPHTHALATE COMPOSITIONS WITH ARYLENE SULFIDE RANDOM COPOLYMERS

[75] Inventors: Howard F. Efner; Michael C. Yu; Ray D. Ramsay, all of Bartlesville, Okla.

[73] Assignee: Phillips Petroleum Company, Bartlesville, Okla.

[21] Appl. No.: 630,920

[22] Filed: Dec. 20, 1990

[51] Int. Cl.$^5$ .............................................. C08L 67/02
[52] U.S. Cl. ..................................... 525/166; 525/175; 525/176; 525/537
[58] Field of Search ................ 525/166, 175, 176, 537

[56] References Cited

U.S. PATENT DOCUMENTS

| | | | |
|---|---|---|---|
| 4,140,671 | 2/1979 | Cohen | 260/40 R |
| 4,251,429 | 2/1981 | Salee | 260/40 R |
| 4,528,346 | 7/1985 | Sugie | 525/523 |
| 4,629,750 | 12/1986 | Hepp | 523/201 |
| 4,689,365 | 8/1987 | Chacko et al. | 524/539 |
| 4,929,665 | 5/1990 | Inoue et al. | 525/471 |
| 5,091,459 | 2/1992 | Howe | 525/176 |

FOREIGN PATENT DOCUMENTS

| | | | |
|---|---|---|---|
| 0092044 | 6/1982 | Japan | 525/166 |
| 9014391 | 11/1990 | PCT Int'l Appl. | 525/166 |

*Primary Examiner*—Melvyn I. Marquis
*Assistant Examiner*—Helen F. Lee
*Attorney, Agent, or Firm*—Morrison Bennett

[57] ABSTRACT

Polyethylene terephthalate molding compositions are provided which comprise polyethylene terephthalate, an aliphatic polyester, a warp resisting amount of an arylene sulfide copolymer, filler, and optionally, colorants.

7 Claims, No Drawings

POLYETHYLENE TEREPHTHALATE COMPOSITIONS WITH ARYLENE SULFIDE RANDOM COPOLYMERS

BACKGROUND OF THE INVENTION

This invention relates to polyethylene terephthalate molding compositions.

It is difficult to make polyethylene terephthalate molding compositions which can be molded into articles having improved resistance to warpage without significant loss of desired physical, mechanical and electrical properties. Yet there is a need for polyethylene terephthalate compositions for such applications as injection molding electrical connectors or other articles in which dimensional stability is critical. Thus, there is a need for polyethylene terephthalate molding compositions having rapid crystallization, good processability, short cycle times, and good flow properties which can be molded into articles having a combination of good electrical, physical and mechanical properties, including low warpage and high heat distortion temperatures.

SUMMARY OF THE INVENTION

It is an object of this invention to provide polyethylene terephthalate compositions which have rapid crystallization, good processability, and good flow rates which can be molded into articles having a combination of good electrical, physical and mechanical properties, including low warpage and high heat distortion temperatures.

Another object is to provide such compositions which can be readily prepared by melt extrusion.

Another object is to provide processes for making and using such compositions.

Yet another object is to provide articles made from such compositions.

In accordance with one embodiment of this invention, a composition comprises:
(a) polyethylene terephthalate;
(b) filler;
(c) an arylene sulfide copolymer;
(d) an aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;
(e) a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said copolymer having a number average molecular weight in excess of about 3,000 prior to neutralization, said metal being selected from the group consisting of sodium and potassium; and
(f) an antioxidant.

Optionally, the inventive compositions may contain a colorant additive.

DETAILED DESCRIPTION OF THE INVENTION

The present invention involves use of an arylene sulfide random copolymer having from about 1 to about 25 mole percent of a meta-substituted dihalo aromatic comonomer for making warp resistant polyethylene terephthalate molding compositions.

More particularly, the molding resin compositions of this invention generally comprise:
(a) from about 8 to about 90 weight percent, more preferably from about 10 to about 85 weight percent, most preferably from about 10 to about 80 weight percent, based on total weight of the composition, of polyethylene terephthalate;
(b) from about 5 to about 65 weight percent, more preferably from about 10 to 60 weight percent, most preferably from about 15 to about 55 weight percent, based on total weight of the composition, of a filler;
(c) from about 5 to about 300 pph resin, more preferably from about 25 to about 200 pph resin, most preferably from about 30 to about 150 pph resin, of an arylene sulfide random copolymer having from about 1 to about 25 mole percent of a meta-substituted dihalo aromatic comonomer;
(d) from about 0.5 to about 15 pph resin, more preferably from about 2.5 to about 10 pph resin, most preferably from about 5 to about 10 pph resin, of an aliphatic polyester having a number average molecular weight ranging from about 7,500 to about 20,000 and which is condensation product of an alkanedioic acid containing from 8 to about 12 carbon atoms per molecule and an alkanediol containing from 2 to about 5 carbon atoms per molecule;
(e) from about 0.1 to about 3 pph resin, more preferably from about 0.2 to about 1.2 pph resin, most preferably from about 0.25 to about 1.0 pph resin, of a metal salt of an ionic hydrocarbon copolymer of an alpha-olefin containing from 2 to 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said polymer having a molecular weight before such neutralization of at least about 3,000, said metal being selected from the group consisting of sodium and potassium; and
(f) from about 0.01 to about 2 pph resin, more preferably from about 0.1 to about 1.5 pph resin, most preferably from about 0.2 to about 1.0 pph resin, of an antioxidant.

By "pph resin" or "pphr" as used herein is meant the parts by weight of the specified components per 100 parts by weight of polyethylene terephthalate.

To color a composition of this invention, one can admix therewith from greater than 0 to about 10 weight percent, more preferably from about 0.05 weight percent to about 8 weight percent, based on total weight of the composition, of a colorant. The amount of colorant which is preferable will vary widely, depending on the widely varying concentrations in the colorants available.

The Polyethylene Terephthalate

The polyethylene terephthalate presently preferred has an inherent viscosity of at least about 0.25, more preferably about 0.4 as measured by ASTM D-2857. The polyethylene terephthalate preferably has an upper limit on inherent viscosity of about 1.2. Inherent viscosity is measured in a 3:1 volume ratio of methylene chloride and trifluoroacetic acid at 30° C. The term "polyethylene terephthalate" as used herein is used generally to include high molecular weight polymers made by condensing ethylene glycol with terephthalic acid or dimethylterephthalate no matter how prepared. This term is meant to include polyethylene terephthalate polymers which are modified by the inclusion of minor amounts, e.g., less than about 20 percent by weight of the polymer, of comonomers or modifying agents. Such comonomers or modifying agents include various diols such as 1,4-butanediol, cyclohexane dimethanol, diethylene glycol, polyalkylene oxide, neopentyl glycol, butylene glycol, and 1,3-propanediol or mixtures of two or more diols. Likewise, such comonomers or modifying agents can include p-hydroxy benzoic acid or various diacids such as isophthalic acid, adipic acid, sebacic acid, and 2,6-naphthalene dicarboxylic acid. Mixtures of p-hydroxy benzoic acid and one or more diacids or of two or more diacids may be used. Mixtures of polyethylene terephthalate resins can be used. Suitable polyethylene terephthalate polymers are commercially available.

Fillers

Conventional fillers known in the art can be used. Examples of non-fibrous, inorganic fillers include clay, mica, talc, kaolin, calcium carbonate, barytes, ceramic spheres, glas spheres, glass flakes, calcium silicate, and the like. Mixtures of two or more non-fibrous inorganic fillers can be used.

Examples of non-fibrous organic fillers include wood and shell flours, starches, carbohydrate by-products, synthetic organics, such as polyvinylidene chloride spheres, and the like. Mixtures of two or more non-fibrous organic fillers can be used.

Examples of metal powders, flakes, or fibers include aluminum, bronze, zinc, nickel, stainless steel, and the like. Mixtures of two or more metals can be used. Oxides of metals such as titanium dioxide, zinc oxide, and the like are also contemplated as useful. Mixtures of two or more metal oxides can be used. Also, mixtures of metals and metal oxides can be used.

Examples of fibrous fillers include those comprised of aramid, carbon, glass, hybrids (such as aramid/carbon, aramid/carbon/glass, aramid/glass, carbon/glass, and the like), boron, ceramic, metal, Wollastonite and mixtures thereof and the like.

Mixtures of organic and inorganic fillers can be used. Also useful are mixtures of fibrous and non-fibrous fillers, including such combinations as glass fibers and glass flakes, glass fibers and mica, glass fibers and Wollastonite, glass fibers and glass spheres, and the like. Metal fillers, metal oxide fillers and mixtures of these can be combined with other fibrous or non-fibrous fillers or with other organic or inorganic fillers or with various mixtures of fillers from these categories.

When mixtures of more than one filler are used, the proportionate amounts of the fillers will vary according to the form and properties of the fillers and according to the properties desired in the articles to be made from the polyethylene terephthalate molding composition. For example, in a composition comprising (a) from about 30 to about 90 weight percent, based on total weight of the composition, of polyethylene terephthalate;

(b) from about 5 to about 65 weight percent, based on total weight of the composition, of filler;

(c) about 5 to about 300 pph resin of an arylene sulfide random copolymer;

(d) from about 0.5 to about 15 pph resin of an aliphatic polyester;

(e) from about 0.1 to about 3 pph resin of a metal salt of an ionic hydrocarbon copolymer; and (f) from about 0.01 to about 2 pph resin of an antioxidant; the filler can comprise a mixture of mica and fiber glass having a ratio of mica to fiber glass from about 10:1 to about 1:10.

The glass fibers presently preferred have an average cross-sectional thickness in the range from about 7 to 15 microns, preferably from about 8 to about 10 microns and an average length in the range from about 2 to about 8 millimeters, preferably from about 2.5 to about 5 millimeters. Such glass fibers are commercially available.

The Arylene Sulfide Random Copolymer

The arylene sulfide random copolymers contemplated as useful in this invention are those having from about 1 to about 25 mole percent, more preferably from about 3 to about 15 mole percent, and most preferably from about 3 to about 12 mole percent, of at least one meta-substituted dihalo aromatic comonomer.

The presently preferred arylene sulfide random copolymers are poly(phenylene sulfide) random copolymers. Suitable poly(phenylene sulfide) random copolymers include those characterized by the presence of repeating units

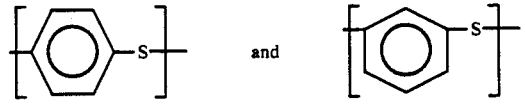

derived, respectively, from the comonomers 1,4-dihalobenzene and 1,3-dihalobenzene wherein the preferred comonomers are 1,4-dichlorobenzene and 1,3-dichlorobenzene.

Although the presently preferred meta-substituted dihalo aromatic comonomers are m-dihalobenzene comonomers, other comonomers contemplated as useful include 1,3-dihalonapthalene and 1,8-dihalonapthalene.

The halogen atoms in the m-dihalobenzene comonomer can be selected from the group consisting of chlorine, bromine and iodine. Suitable m-dihalobenzenes include m-dichlorobenzene, m-dibromobenzene, m-diiodobenzene, 1-chloro-3-bromobenzene, 1-chloro-3-iodobenzene, 1-bromo-3-iodobenzene and mixtures thereof. Minor amounts of the corresponding ortho isomers can also be present without any detrimental effects.

The halogen atoms in the p-dihalobenzene comonomer can be selected from the group consisting of chlorine, bromine and iodine. Suitable p-dihalobenzenes include p-dichlorobenzene, p-dibromobenzene, p-diiodobenzene, 1-chloro-4-bromobenzene, 1-chloro-4-bromobenzene, 1-chloro-4-iodobenzene, 1-bromo-4-iodobenzene and mixtures thereof.

From greater than 0 to about 1½ mole percent of trichlorobenzene may be used for molecular weight control. Preferably the arylene sulfide random copolymer has a melt flow index, measured at 315° C. using a 5 Kg weight and a standard orifice, within the range from about 10 to about 300.

The Aliphatic Polyester

The aliphatic polyesters have a number average molecular weight in the range from about 7,500 to about 20,000, preferably about 8,000 to about 10,000 and comprise condensation products of alkanedioic acids containing from 8 to about 12 carbon atoms per molecule and alkanediols containing from 2 to about 5 carbon atoms per molecule. Preferred alkanedioic acid comonomers for such polyesters contain 8 to 10 carbon atoms per molecule and preferred alkanediol comonomers for such polyesters contain 3 to 4 carbon atoms per molecule. One presently most preferred such polyester is a condensation product of sebacic acid and 1,2-propanediol. Characteristically, the aliphatic polyester is liquid at ambient conditions.

The Ionic Hydrocarbon Copolymer

The ionic hydrocarbon copolymer contemplated as useful is a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of the metal with the copolymer having a number average molecular weight in excess of about 3,000 prior to neutralization, and with the metal being selected from the group consisting of sodium and potassium.

Representative ionic hydrocarbon copolymers comprise the sodium and/or potassium salts of copolymers of olefins (especially ethylene) with acrylic acid, methacrylic acid, or mixtures thereof which are at least about 30 percent neutralized. Suitable copolymers are commercially available.

The aliphatic polyester and the ionic hydrocarbon copolymer (also known as ethylene acid copolymer or ionomer) in combination with polyethylene terephthalate induce rapid crystallization of the polyethylene terephthalate so that melt injection of the composition into a mold having a surface temperature of about 110° C. results in molded products with good properties. Typical cycle times at such a mold temperature are characteristically not more than about 30 seconds.

The Antioxidant

Many different antioxidants can be used. In general, preferred antioxidants are thermally stable at the processing temperature employed. Hindered phenol antioxidants are presently preferred. The antioxidant which is presently most preferred is available from Ciba-Geigy Corporation as "Irganox 1010", the active component of which is believed to be tetrakis (methylene 3-[3,5-di-t-butyl-4-hydroxyphenyl] propionate) methane. Other suitable antioxidants include, but are not limited to:

(A) Borg Warner's "Ultranox 626", the active agent of which is bis[2,4-di-t-butyl phenyl pentaerythritol] diphosphite;

(B) Ciba-Geigy's "Irganox 259" the active agent of which is 1,6-hexamethylene bis(3,5-di-t-butyl-4-hydroxy-hydrocinnamate) and/or 1,6-hexamethylene bis(3-[3,5-di-t-butyl-4-hydroxyphenyl]-propionate);

(C) Ferro Corporation's "Oxi-Chek 116", the active agent of which is octadecyl 3,5-di-t-butyl-4-hydroxy-hydrocinnamate; and (D) Ciba-Geigy's "Irganox 1098", the active agent of which is N,N'-hexamethylene bis[3,5-di-t-butyl-4-hydroxy-hydrocinnamide].

Other Additives

In addition to the components discussed herein, the compositions of this invention may contain other additives commonly employed (and in the quantities known to the art or sufficient to achieve the desired result) with polyethylene terephthalate. Examples include colorants such as carbon black or blue concentrate, mold release agents such as low molecular weight polyethylene wax, tougheners including but not limited to commercially available epoxy compounds which, e.g., include bisphenol A/epichlorohydrin condensation products, heat and ultraviolet light stabilizers, and the like. Usually, the total quantity of such other additives is not more than about 20 weight percent of the total weight of the composition, although higher amounts could be used if desired.

Preparation

The compositions of this invention are prepared by blending together the components by any convenient means. For example, dry polyethylene terephthalate can be dry mixed in any suitable blender or tumbling means with the other components and the resulting mixture melt-extruded. Alternatively, all components except the glass or other filler can be mixed by conventional means and the glass or other filler then added to the already molten resin mixture. Preferably, the polyethylene terephthalate is preblended with the glass fibers and then dry mixed with the other additives before melt-extrusion. A convenient melt-extrusion temperature range is from about 520° to about 580° F. The extrudate is preferably in a strand form which can be chopped into pellets or the like as desired.

Composition

Suitable additive ranges for the molding resin compositions of this invention are summarized in the following Table 1:

TABLE 1

Polyethylene Terephthalate Molding Resin Compositions

| Component | Broad Range | Intermediate Range | Preferred Range |
|---|---|---|---|
| Polyethylene Terephthalate, wt %[a] | 8–90 | 10–85 | 10–80 |
| Glass Fibers, wt %[a] | 5–65 | 10–60 | 15–55 |
| Arylene Sulfide Random Copolymer, pph resin | 5–300 | 25–200 | 30–150 |
| Aliphatic Polyester, pph resin | 0.5–15 | 2.5–10 | 5–10 |
| Ionic Hydrocarbon Copolymer, pph resin | 0.1–3 | 0.2–1.2 | 0.25–1.0 |
| Antioxidant, pph resin | 0.01–2 | 0.1–1.5 | 0.2–1.0 |
| Colorants[b], wt %[a] | 0–10 | .01–9 | 0.05–8 |
| Other Additives[b], wt %[a] | 0–20 | | |

[a]Based on total weight of the composition.
[b]Optional

EXAMPLES

The following examples describe the invention and should be taken as illustrative and not restrictive.

EXAMPLE I

This example describes the pilot plant preparation of poly(phenylene sulfide) copolymers by contacting a sulfur source, para-dichlorobenzene (p-DCB) and meta-dichlorobenzene (m-DCB) in N-methyl-2-pyrrolidone (NMP) solvent containing molecular weight modifying amounts of sodium acetate (NaOAc) and 1,2,4-trichlorobenzene (TCB). The mixed dichlorobenzenes contained a minor amount of ortho-dichlorobenzene (o-DCB). Duplicate copolymerization runs were carried out in a 90-gallon reactor.

The poly(phenylene sulfide) (PPS) random copolymers were prepared in a three-step procedure:
(i) a sulfur source solution was prepared by contacting aqueous sodium hydroxide (NaOH) solution and aqueous sodium hydrosulfide (NaSH) solution in the presence of N-methyl-2-pyrroidone (NMP);
(ii) the solution formed in (i) was thermally dehydrated;
(iii) mixed dichlorobenzenes were contacted with solution (ii) to produce PPS random copolymers.

The sulfur source solution was prepared in an appropriate reaction vessel by cotacting NaOH and NaSH in the following manner. The vessel was charged with 71.7 pounds of an aqueous stock solution of sodium hydroxide (49.9 wt. % NaOH; 0.89 lb. mole NaOH) and 17 gallons of NMP. The temperature of this mixture was increased to 300° F. and maintained at that temperature for about one hour. To this mixture was added 87.1 pounds of an aqueous stock solution of sodium hydrosulfide (59.4 wt. % NaSH; 0.92 lb. mole NaSH). This mixture was maintained at 300° F. for 30 minutes to complete the formation of a sulfur source solution.

The sulfur source solution was thermally dehydrated by fractionation of an appropriate amount of water at an elevated temperature over a 70-minute period. The water was removed by distillation until the pot temperature reached approximately 410° F. This mixture was now suitable for adding to the polymerization reactor.

In a separate operation, the following materials were charged to a 90-gallon polymerization reactor: 23 lbs. (0.28 lb. mole) sodium acetate (NaOAc), 107 lbs. (0.728 lb. mole) para-dichlorobenzene, 27.2 lbs. mixed dichlorobenzenes (42.8 wt. % m-DCB; 47.2 wt. % p-DCB; 7.7 wt % o-DCB; 0.079 lb. mole m-DCB; 0.087 lb. mole p-DCB; 0.014 lb. mole o-DCB); 0.67 lb. (0.004 lb. mole) 1,2,4-trichlorobenzene and 2 gallons of NMP.

The freshly dehydrated sulfur source comonomer solution was flushed into the polymerization reactor with about 17 gallons of NMP. The reactor was sealed and pressured with nitrogen. The initial temperature of the stirred reaction mass was about 410° F.

The temperature of the reaction mixture was increased to about 450° F. at a rate of about 1.5 degrees per minute and the temperature was maintained at 450° F. for a period of about 2 hours. At the end of two hours, a 3.35-pound portion of deionized water was added to the reactor.

The temperature of the reaction mixture was increased to 510° F. at a rate of about 3 degrees per minute and the temperature was maintained at 510° F. for a period of about 3 hours.

The reactor stirrer speed was set at 500 rpm and the system was cooled from 510° F. to 460° F. at a rate of 5 degrees per minute. The temperature was further decreased from 460° F. to 350° F. at a rate of 0.75 degree per minute. As the system reached a temperature of 350° F., the cooling rate was once again increased to 5 degrees per minute. When the temperature of the reaction mixture reached 275° F., 10 gallons of deionized water was added to quench the reaction.

The entire contents of the reactor were transferred to an appropriate vessel. The reactor was flushed with 60 additional gallons of deionized water and these washings were combined with the other material previously removed from the reactor.

NMP was recovered for re-use by steam stripping and solids were separated by conventional means. The recovered solid was successively washed two times with ambient temperature tap water, two times with hot deionized water and finally with an ambient temperature deionized water rinse. The dried PPS random copolymer product weighed 78 pounds and exhibited a flow rate of 84 grams/10 minutes. This PPS random copolymer was used as the inventive additive in runs A, B and C shown in Table II.

A duplicate run carried out with essentially the same quantities of reactants and in the same manner yielded 71 pounds of PPS random copolymer which exhibited a flow rate of 34 grams/10 minutes. This PPS random copolymer was used as the inventive additive in run D shown in Table II.

Based on materials charged to the polymerization reactor, the mole percent levels, respectively, for TCB and m-DCB in the PPS random copolymers were about 0.4 and about 8.

EXAMPLE II

This example describes the use of poly(phenylene sulfide) random copolymers as warp-resistant additives in polyethylene terephthalate molding compositions.

The PPS random copolymers prepared in Example I were compounded into polyethylene terephthalate formulations to provide molding compositions.

The polyethylene terephthalate resin was vacuum dried for about 16 hours at 250° F. prior to compounding. Other dessicant or dehumidifing drying methods are acceptable. The dry resin was removed from the drying oven, then quickly tumble blended with the other ingredients prior to compounding in a 1.5 inch 24:1 1/d Davis Standard extruder equipped with a single stage mixing screw and strand die. The melt temperature range was from about 540° to about 560° F. The mixture was either flood fed or metered to the extruder using a volumetric feeder. A nitrogen blanket was used to protect the polyethylene terephthalate resin from moisture absorption in the feeder or hopper. The extruded strands were briefly quenched in a water bath, allowed to dry using latent heat, and pelletized into approximately ⅛ inch pellets.

The pelletized compositions were dried overnight in a dehumidifing oven at 225° F. prior to injection molding. Test specimens were molded in standard molds on a 55-ton hydraulic clamp 2.9-ounce injection molding press, with a mold surface temperature of about 235° F. and a cylinder temperature of about 540° F. The dry molding composition was protected from moisture by a dry nitrogen blanket on the machine hopper. A fast injection speed was used with about 5-second injection time, about 4-second hold time, and about 25-second cooling time. Injection pressure was adjusted for mold filling. Holding pressure was about 80% of injection pressure.

TABLE II

Poly(Phenylene Sulfide) Random Copolymer Warp-Resistant Additive in Polyethylene Terephthalate Molding Compositions

|  | Run A | Run B | Run C | Run D | Run E | Run F | Run G | Run H |
|---|---|---|---|---|---|---|---|---|
| Polyethylene Terephthalate[a], wt. % | 44.0 | 38.0 | 38.0 | 38 | 44.0 | 38.0 | 38.0 | 64.2 |
| Glass Fibers[b], wt. % | 30 | 30 | 30 | 30 | 30 | 30 | 30 | 30 |
| Poly(phenylene sulfide) Copolymer, pphr | 50[c] | 75[c] | 75[c] | 75[d] | | | | |
| Poly(phenylene sulfide) Homopolymer (Low Ash)[e], pphr | | | | | 50 | 75 | | |
| Poly(phenylene sulfide) Homopolymer (High Ash)[f], pphr | | | | | | | 75 | |
| Aliphatic polyester[g], pphr | 7 | 7 | 7 | 7 | 7 | 7 | 7 | 7 |
| Antioxidant[h], pphr | 1 | 1 | 0.5 | 0.5 | 1 | 1 | 1 | 1 |
| Ionic Hydrocarbon Copolymer[i], pphr | 1 | 1 | 0.5 | 0.5 | 1 | 1 | 1 | 1 |
| Physical Properties | | | | | | | | |
| Flow Rate at 275° C., 5 Kg | 27 | 21 | 20 | 13 | 7.9 | 0.6 | 0.9 | 23 |
| Color | light grey | light grey | light tan | light tan | light grey | light grey | tan | light tan |
| Surface | slightly dull | dull | dull | slightly dull | slightly dull | slightly dull | very slightly dull | slightly dull |
| Flexural Modulus, Msi | 1.5 | 1.5 | 1.4 | 1.5 | 1.4 | 1.5 | 1.5 | 1.4 |
| Flexural Strength, Ksi | 27.9 | 26.0 | 27.2 | 28.4 | 27.8 | 27.1 | 25.3 | 33.6 |
| Tensile Break, Ksi | 19.5 | 19.2 | 18.8 | 20.5 | 19.5 | 18.7 | 18.5 | 21.2 |
| % Elongation | 4.3 | 4.3 | 4.3 | 4.8 | 4.6 | 4.1 | 3.9 | 5.4 |
| Notched IZOD, ft.lb./in. | 1.3 | 1.3 | 1.4 | 1.4 | 1.5 | 1.4 | 1.3 | 1.8 |
| Heat Distortion Temperature, °C. at 1820 KPa | 220 | 218 | 215 | 210 | 232 | 235 | 235 | 231 |
| Warpage[j], (mm) | <1 | <1 | <1 | <1 | 3 | 4 | 5 | 4 |

Notes for Table II
[a]Goodyear Traytuf ® 5900 polyethylene terephthalate was used.
[b]492AA glass from Owens-Corning Company was used.
[c]Poly(phenylene sulfide) random copolymer with a flow rate of 84 grams/10 minutes and about 8 mole percent meta-dichlorobene based on comonomers was used.
[d]Poly(phenylene sulfide) random copolymer with a flow rate of 34 grams/10 minutes and about 8 mole percent meta-dichlorobenzene based on comonomers was used.
[e]Acid washed homopolymer with less than 0.1 percent ash and a flow rate of 600 grams/10 minutes was used.
[f]Non-acid washed homopolymer with ash value in the range of 0.6 to 0.8 percent and a flow rate of 200 grams/10 minutes was used. This was GR-01, available from Phillips Petroleum Company.
[g]Paraplex ® G-25 available from C. P. Hall Company was used.
[h]Irganox ® 1010 available from Ciba-Geigy Corporation was used.
[i]Formion ® 105 available from Schulman Company was used.
[j]Maximum divergence in millimeters from a planar surface observed along the entire circumference of a 2.5-inch diameter circular disc pressed against the surface at random points on the circumference of the disc.

The inventive runs which contained the poly(phenylene sulfide) random copolymers are designated as Runs A, B, C and D in Table II. The control runs which contained poly(phenylene sulfide) homopolymers are designated as Runs E, F and G. An additional control run with neither poly(phenylene sulfide) random copolymer nor poly(phenylene sulfide) homopolymer is designated as run H.

Referring to the physical properties of the molded samples in runs A through H, it is evident that the values are comparable with the exception of the warpage parameter. In the test used to determine warpage, the lower values indicate less warpage. The numbers indicate the maximum divergence (in millimeters) from a planar surface observed along the entire circumference of a 2.5 inch diameter circular disc pressed against the planar surface at random points on the circumference of the disc. Thus, the greater the warpage, the greater the maximum divergence of the disc from a planar surface under the test conditions.

Referring to the control runs E, F, G and H, the warpage values were, respectively, 3, 4, 5 and 4 millimeters. It can be seen that these values are significantly greater than those observed in the invention runs A, B, C and D which showed a maximum divergence of <1 millimeter. These results clearly demonstrate that the poly(phenylene sulfide) random copolymers of this invention are more effective warp-resistant additives in polyethylene terephthalate molding compositions than are the state-of-the-art poly(phenylene sulfide) homopolymers.

EXAMPLE III

Two more test runs, designated Run I and Run J in Table III, were made using polyethylene terephthalate formulations with a paradichloro-based poly(phenylene sulfide). This poly(phenylene sulfide) with no meta-substitution is, when uncured, equivalent to that designated Ryton V-1 by Phillips Petroleum Company. The poly(phenylene sulfide) used for Runs I and J is a low molecular weight polymer with a much higher flow rate than the poly(phenylene sulfide) random copolymer used in the invention runs. Run I was made using uncured poly(phenylene sulfide) and Run J was made using poly(phenylene sulfide) which had been cured to lower the flow rate. Articles made with the compositions of both Run I and Run J exhibited significantly more warpage than the invention runs. The compositions of Run I and Run J and properties of articles made therefrom are shown in Table III.

TABLE III

Warp-Resistant Polyethylene Terephthalate/poly(phenylene sulfide) Molding Compositions Compared to Non-warp-resisting Polyethylene Terephthalate/poly(phenylene sulfide) Molding Compositions

|  | Run C[a] | Run I | Run J |
|---|---|---|---|
| Components | | | |
| Polyethylene terephthalate[b], wt. % | 38.0 | 38.25 | 38.25 |
| Glass fibers[c], wt. % | 30 | 30 | 30 |

TABLE III-continued

Warp-Resistant Polyethylene Terephthalate/poly(phenylene sulfide) Molding Compositions Compared to Non-warp-resisting Polyethylene Terephthalate/poly(phenylene sulfide) Molding Compositions

|  | Run C[a] | Run I | Run J |
|---|---|---|---|
| Poly(phenylene sulfide) | 75[d] | 75[e] | 75[f] |
| Copolymer, pphr |  |  |  |
| Aliphatic polyester[g], pphr | 7.0 | 7.0 | 7.0 |
| Antioxidant[h], pphr | 0.5 | 0.5 | 0.5 |
| Ionic hydrocarbon copolymer[i], pphr | 0.5 | 0.5 | 0.5 |
| Physical Properties |  |  |  |
| Flow Rate at 275° C., 5 kg | 20 | 477 | 275 |
| Color | light tan |  |  |
| Surface | dull |  |  |
| Flexural Modulus, Msi | 1.4 | 1.5 | 1.4 |
| Flexural Strength, Ksi | 27.2 | 23.4 | 24.7 |
| Tensile Break, Ksi | 18.8 | 16.8 | 17.2 |
| % Elongation | 4.3 | 3.2 | 3.2 |
| Notched IZOD, ft.lb./in. | 1.4 | 1.4 | 1.5 |
| Heat Distortion Temperature, °C. at 1820 KPa | 215 |  |  |
| Warpage[j], (mm) | <1 | 6 | 5 |

Notes for Table III
[a]Invention Run C from Table II has been included here for facilitating comparison.
[b]Goodyear Traytuf ® 5900 polyethylene terephthalate was used.
[c]492AA glass from Owens-Corning Company was used.
[d]poly(phenylene sulfide) random copolymer with a flow rate of 84 grams/10 minutes and about 8 mole percent meta-dichlorobene based on comonomers was used.
[e]Similar in properties to Ryton V-1 (Phillips Petroleum, Bartlesville, Oklahoma), an uncured poly(phenylene sulfide).
[f]The same poly(phenylene sulfide) as that used in Run I except that cured resin was used for Run J.
[g]Paraplex ® G-25 available from C. P. Hall Company was used.
[h]Irganox ® 1010 available from Ciba-Geigy Corporation was used.
[i]Formion ® 105 available from Schulman Company was used.
[j]Maximum divergence in millimeters from a planar surface observed along the entire circumference of a 2.5-inch diameter circular disc pressed against the surface at random points on the circumference of the disc.

While the compositions, processes and articles of manufacture of this invention have been described in detail for the purpose of illustration, the inventive compositions, processes and articles of manufacture are not to be construed as limited thereby. This patent is intended to cover all changes and modifications within the spirit and scope thereof.

That which is claimed is:

1. A composition comprising:
   (a) polyethylene terephthalate;
   (b) filler;
   (c) an arylene sulfide copolymer having from about 1 to about 25 mole percent of at least one meta-substituted dihalo-aromatic comonomer;
   (d) an aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;
   (e) a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said copolymer having a number average molecular weight in excess of about 3,000 prior to neutralization, said metal being selected from the group consisting of sodium and potassium; and
   (f) an antioxidant.

2. A composition comprising:
   (a) from about 30 to about 90 weight percent, based on total weight of the composition, of polyethylene terephthalate;
   (b) from about 5 to about 65 weight percent, based on total weight of the composition, of glass fibers;
   (c) from about 50 to about 75 pph resin of an arylene sulfide random copolymer having from about 1 to about 25 mole percent of at least one meta-substituted dihalo-aromatic comonomer;
   (d) from about 0.5 to about 15 pph resin of an aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;
   (e) from about 0.1 to about 3 pph resin of a metal salt of an ionic hydrocarbon copolymer of an alpha-olefin containing from 2 to about 5 carbon atoms per molecule and an alpha,beta-ethylenically unsaturated carboxylic acid containing from about 3 to about 5 carbon atoms per molecule in which copolymer the neutralized anionic carboxyl groups are associated with cations of said metal, said copolymer having a number average molecular weight in excess of about 3,000 prior to neutralization, said metal being selected from the group consisting of sodium and potassium; and
   (f) from about 0.01 to about 2 pph resin of an antioxidant.

3. A composition as recited in claim 2 which additionally contains from greater than 0 to about 10 weight percent, based on weight of the composition of a colorant.

4. A composition as recited in claim 1 wherein said at least one meta-substituted dihalo aromatic comonomer is a meta-substituted dihalobenzene comonomer.

5. A composition as recited in claim 4 wherein said arylene sulfide random copolymer has from about 1 to about 25 mole percent of a comonomer of m-dichlorobenzene and p-dichlorobenzene.

6. A composition as recited in claim 4 wherein said arylene sulfide random copolymer has from about 3 to about 15 mole percent of a comonomer of m-dichlorobenzene and p-dichlorobenzene.

7. A composition as recited in claim 4 wherein said arylene sulfide random copolymer has from about 3 to about 12 mole percent of a comonomer of m-dichlorobenzene and p-dichlorobenzene.

* * * * *